Sept. 7, 1965   D. C. GATTIKER ETAL   3,205,062
NITRIC ACID ACIDULATION OF PHOSPHATE ROCK
Filed March 12, 1962
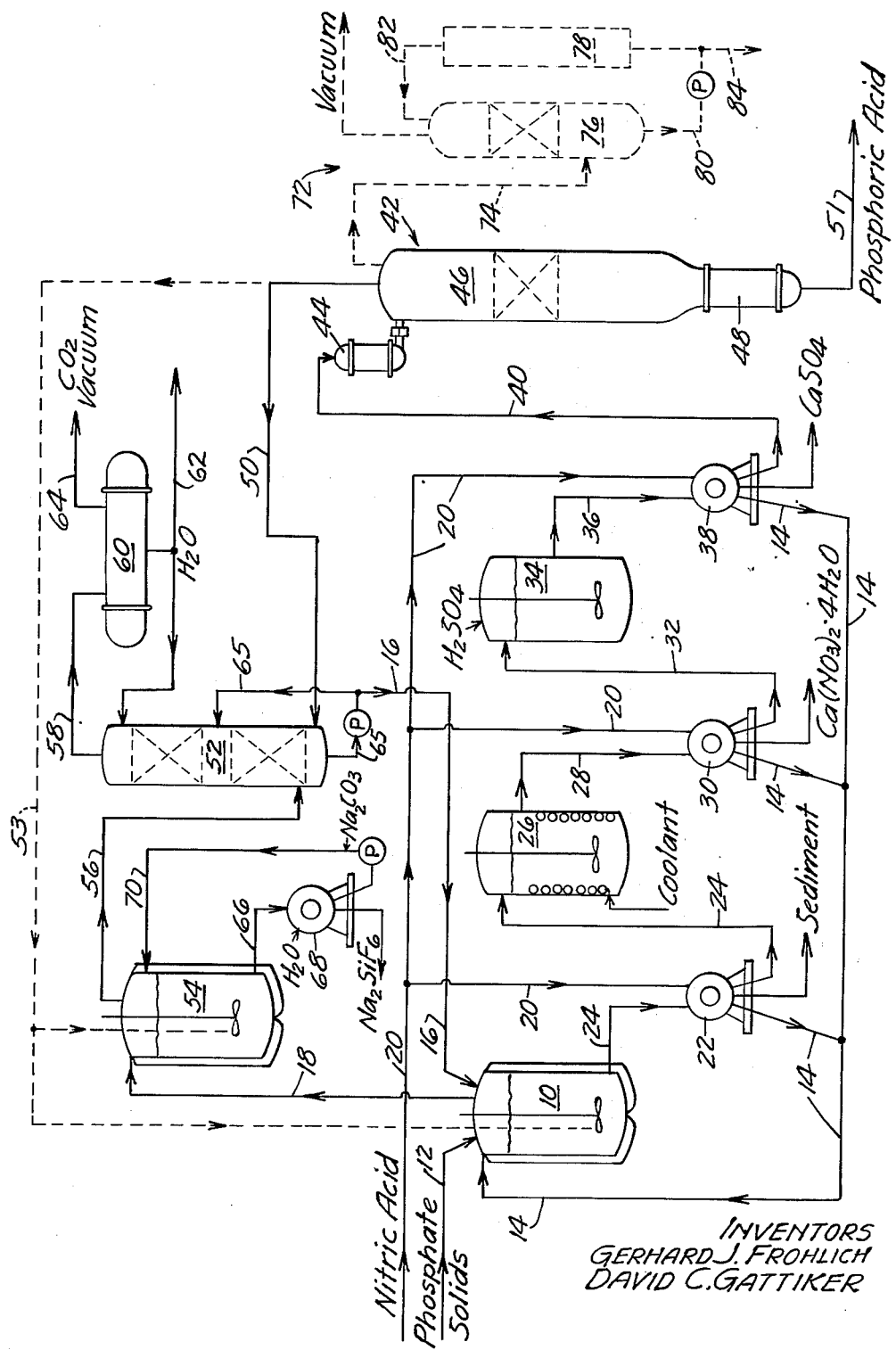
INVENTORS
GERHARD J. FROHLICH
DAVID C. GATTIKER United States Patent Office 3,205,062
Patented Sept. 7, 1965

3,205,062
NITRIC ACID ACIDULATION OF
PHOSPHATE ROCK
David C. Gattiker and Gerhard J. Frohlich, St. Paul,
Minn., assignors to St. Paul Ammonia Products, Inc.,
St. Paul, Minn., a corporation of Minnesota
Filed Mar. 12, 1962, Ser. No. 178,960
2 Claims. (Cl. 71—39)

This invention relates to the treatment of solid calcium phosphates with nitric acid to dissolve the solids and produce more soluble phosphates and/or phosphoric acid therefrom. More particularly this invention relates to a process for the nitric acid acidulation of phosphate materials in a new and useful manner which includes procedures for facilitating the separation of excess nitric acid and fluorinated compounds in readily separable forms from the reaction mixture and economically refining the resultant phosphoric acid liquid. In another aspect, this invention provides a nitric acid acidulation procedure for the production of phosphoric acid which procedure greatly reduces the corrosion potentialities of the system while facilitating separation of fluorine by-products in a commercially useful form. In still another aspect this invention provides a purification procedure for nitric acid and fluoro-silicate contaminated phosphoric acid which avoids $SiO_2$ clogging of the purification apparatus.

Phosphoric acid is customarily produced through thermal decomposition of phosphate rock or by the sulphuric acid acidulation of phosphate rock. Thermal decomposition of rock is only feasible where a relatively cheap source of energy is available. Thus, in those areas where no sufficiently economical energy source is available, acidulation of phosphate rock is the preferred procedure for the production of phosphoric acid. Essentially the acidulation of phosphate rock involves the dissolution of the rock phosphates in sulphuric acid and the formation of calcium sulphates. The liquid phosphoric acid obtained in this manner which also contains various impurities, is often referred to as "wet process" acid. Unless there is a readily available source of sulphur or sulphur compounds the transportation expenses of the raw materials make this procedure undesirably expensive; furthermore, in general little use can be made of calcium sulphate, the primary by-product of sulphuric acid acidulation of phosphate rock, and in most cases this by-product simply represents a disposal problem.

Since it is quite well known that solid phosphate materials will readily dissolve in nitric acid as well as in sulphuric acid, acidulation of phosphate materials with nitric acid to produce phosphoric acid has heretofore been proposed and, indeed, procedures have been suggested over the years for treating phosphate rock with nitric acid. Thus, it has been proposed to use nitric acid of relatively low strength, e.g. 40–70% concentration, and in considerable excess to form fairly free flowing liquid reaction mixtures from which $Ca(NO_3)_2 \cdot 4H_2O$ can be precipitated by chilling, e.g., Patent No. 1,816,285; to recycle the liquid mixtures for maintaining a sufficient liquidity in the system and facilitate further separation of $Ca(NO_3)_2 \cdot 4H_2O$ from the mother liquid by two-stage cooling, e.g. Patent No. 1,939,351; and to facilitate other economies in nitric acid acidulation. Yet, to our knowledge these prior known procedures have not resulted in a commercially useful nitric acid acidulation process for the production of phosphoric acid from phosphate rock and have been found useful in limited areas only to produce water soluble phosphates.

In our own work on nitric acid acidulation of phosphate rock following these prior known and suggested procedures it became apparent that the usefully economical production of phosphoric acid by distillation with these known procedures as suggested by the Johnson patents, supra, could not be successful as the corrosion rate on the processing equipment construction materials was much too great, recovery and re-use of excess nitric acid in the system was not practical as it simply increased the corrosion potentialities, and that attempts to carry the process through to the production of phosphoric acid by distillation as suggested in the patents noted supra, resulted in rapid clogging of the purification equipment. Further, sand and slime removal with these prior known procedures was unduly slow and resulted in a cloudy mother liquor.

It is a principal object of this invention to provide an improved nitric acid acidulation process which enables completion of the conversion of solid phosphate materials to a phosphoric acid-calcium nitrate liquid mixture in an economical manner to greatly reduce equipment corrosion in the subsequent refining steps, which process includes the recycling of excess nitric acid, accompanied by the production of commercially valuable fluorinated silicon compounds.

Prior to our invention the importance of fluorine removal from the liquid reaction mixture resulting from the acidulation of phosphate rock with nitric acid was not recognized as a significant factor in the promulgation of a technically useful and commercially competitive nitric acid acidulation procedure for the production of phosphoric acid and /or usefully soluble phosphates from phosphate rock.

While the formation of low fluorine fertilizers by steam distillation of liquid obtained by the decomposition of phosphates by the action of nitric acid has been suggested, e.g., see Plusje Patent No. 2,504,446, issued April 18, 1950, such procedures require practicing the acidulation of the phosphate solids with a nitric acid starved reaction mixture to inhibit $Ca(NO_3)_2$ formation and further necessitates removal of the fluorine at a stage subsequent to the initial acidulation. We have discovered a method which enables fluorine removal during the nitric acid acidulation of the phosphate rock while using stoichiometric, and even preferably, excess amounts of nitric acid.

While the amount of fluorine present in the calcium phosphate rock typically amounts to no more than about 4% of the total rock content, retention of this fluorine in nitric acid-phosphoric acid mixtures is detrimental since the conditions in the system promote the formation of hydrofluoric acid which is a reducing acid whereas $HNO_3$ is an oxidizing acid. Construction materials which resist nitric acid and which are ordinarily used in apparatuses carrying nitric acid are prone to relatively rapid corrosion by hydrofluoric acid so that in general these two acids are quite incompatible with the same materials of construction, different materials being generally utilized to handle each of these acids separately. Thus, any build-up of hydrofluoric acid in the system can phenomenally increase the corrosion rate of the system. Further, upon final purification of the phosphoric acid in the course of removing remaining nitric acid any silicon tetrafluoride present tends to hydrolyze to create $SiO_2$ during the vapor condensation of the nitric acid in conventional tube type heat exchangers. This silicon dioxide builds up in layers and lines the heat exchanger tubes, this contamination quickly clogging the heat exchanger and requiring shut-down of the system.

The aforementioned, and other procedural difficulties attendant to the production of phosphoric acid by nitric acid acidulation are obviated by the practice of our invention. In accordance with our invention in the preparation of phosphoric acid by nitric acid acidulation, at least about stoichiometric quantities, and preferably excess, nitric acid is used in the acidulation reaction, which reaction is carried out under boiling conditions, i.e., 120°–130° C. at atmospheric pressure, and preferably in the presence of sufficient silica surface to react with substantially all of the fluorine in the reaction mixture, whereupon a nitric acid-water vapor is volatilized from the reaction mixture along with sufficient silicon tetrafluoride and HF to reduce the fluorine content of the reaction mixture to a maximum of about 2% of the phosphate starting material. Thereafter, the fluorinated compounds in the volatilized effluent are precipitated as an insoluble alkali metal silicon polyfluoride, and the nitric acid thus cleaned is returned to the acidulation reactor for re-use.

We have discovered that this procedure provides a nitric acid acidulation process for phosphate rock wherein an unusually clear and sediment free phosphoric acid-calcium nitrate mother liquor results following sand and slime separation.

This procedure greatly reduces the amount of fluorine present during the subsequent distillation purification of the phosphoric acid. Further, we have found that as the nitric acid-water-$SiF_4$ vapor is distilled off during this final purification the small amounts of silicon tetrafluoride present in the distillation vapor when this vapor is condensed by direct contact with its own condensate does not deposit undesirable $SiO_2$ layers on the heat exchange equipment.

The foregoing as well as other advantages are attained by this invention as will be apparent as the description proceeds in more detail in conjunction with the accompanying drawing wherein FIGURE 1 is a flow diagram illustrating the various stages in the operation from the initial acidulation to the final purification of the phosphoric acid product.

In general the process comprises first acidulating crushed phosphate rock in a reaction vessel 10 with at least about a stoichiometric amount of nitric acid, and preferably excess nitric acid, the excess being anywhere from 15% to 100% or greater, and preferably about 15–60% excess. The nitric acid should not be too highly concentrated and is preferably of a concentration between about 40% and 70%. This initial acidulation is carried out under conditions such that the reaction mixture is maintained under boiling conditions. At atmospheric pressure, such conditions require a temperature of around 120–130° C. As the pressure is lowered the temperature required is lowered to maintain boiling conditions. For example, at 50 mm. Hg the temperature required is about 64° C., at 100 mm. Hg the temperature reqired is about 77° C., etc. at 200 mm. Hg, 92° C., etc. However, even when the acidulation is practiced at lower pressures than 50 mm. Hg the temperature should be maintained above 55° C. to maintain a reasonable reaction rate.

Crushed phosphate rock is introduced into the reaction vessel 10 through line 12 and nitric acid through line 14, being fed from a main supply line 20, and through recycling line 16. During this initial acidulation reaction a sufficient excess of silica is maintained in the reaction vessel to facilitate reaction of the fluorine constituents of the rock with the silicon to effect removal of sufficient fluorine (in the form of $SiF_4$ and HF) from the system to reduce the fluorine content of the remaining reaction mixture to less than about 2% of the starting phosphate material.

A sufficient amount of available silicon must be maintained in the system to form the readily volatilized silicon tetrafluoride which goes out of the system with the water-nitric vapor that is flashed off at this point. If boiling conditions and sufficient silica surface are not present, then only a very small amount, and in any event less than 50% of the available fluorine in the system, is removed. It is not known precisely how the fluorine is carried in the rock but it is generally believed it is carried in one of the following two forms: $3Ca_3(PO_4)_2 \cdot CaF_2$ or $CaSiF_6$. Regardless of the form it is in, in the preparation of the present invnetion it is desired to reduce the fluorine remaining in the reaction mixture to the lowest possible amount during the initial acidulation reaction.

It is believed that some of the fluorine present in the rock is probably already tied to the silicon as some fluorine goes off in the form of $SiF_4$ with the nitric acid-water effluent under the prior practiced reaction conditions, the conversion being apparently from $CaSiF_6$ to $H_2SiF_6$ which in turn readily converts to silicon tetrafluoride and hydrofluoric acid in accordance with the following equation: $H_2SiF_6 \rightarrow SiF_4 + 2HF$. However, the HF formed by this reaction and the fluorine in the $CaF_2$ are not so readily removed. Apparently to convert these compounds to volatile $SiF_4$, not only must sufficient silicon be present for reaction, as the quantity normally in the rock is usually sufficient, but sufficient silica surface apparently must be exposed to facilitate this conversion. We have found that this silicon surface, in the practice of our process, is preferably provided by powdered amorphous, silicic acid, as for example ground to a size range which passes through 100 mesh screen. Crystallized silicas such as finely ground sand, while usable, are not as effective. As a practical matter it is not feasible to crush the rock to a state where sufficient silica surface is exposed for reaction within a reasonable time, e.g. two hours or less, so that about one half to one part amorphous, finely divided, e.g. finer than 100 mesh, silicon for each 1 to 2 parts, and preferably for each part fluorine, in the rock should be added to maintain the flow of the acidulation reaction mixture through the first reaction vessel at a reasonable rate.

Under these acidulation conditions, less than 1% fluorine, based on the total rock solids remains in the reaction mixture, the remainder leaving the system with the nitric acid-water vapor which leaves the acidulation vessel through line 18. When so vaporized, as $SiF_4$ and HF, this fluorine can be readily recovered in valuable commercial form as alkali silicon fluorides, e.g. $K_2SiF_6$, $Na_2SiF_6$, during cleansing of the $HNO_3$ for recycling in the system by a procedure described in more detail hereinafter.

Upon carrying out this main acidulation step, the reaction mixture comprises basically a mixture of calcium nitrate and phosphoric acid with some remaining free nitric acid, some fluorine containing constituents, and insolubles, primarily sand and slime.

By carrying the reaction out under boiling conditions, we have also found that upon clarification of the reaction mixture the resulting liquor is much clearer than those formed following clarification of the reaction mixtures of previously suggested nitric acid acidulation procedures, and that slime and sand readily settle out therefrom with few if any colloidal solids remaining. This clarified liquor greatly facilitates the subsequent procedural separations. From the acidulation reaction vessel 10 the reaction mixture proceeds through line 24 to a separator 22 where the sand and slime are filtered from the system, washed with nitric acid from supply line 20 and discarded.

The remaining mother liquor is conducted through line 24 to a crystallizing vessel 26 in which vessel crystallization of the calcium nitrate tetrahydrate $Ca(NO_3)_2 \cdot 4H_2O$ takes place by chilling the liquor. In order to facilitate this crystallization, the crystallization vessel 26 is cooled in stages through a final temperature of $-15°$ C. or thereabouts over a relatively long period of time, on the order of 2 hours or so, to form large tetrahydrate crystals. The resulting crystal carrying liquor is transferred via line 28 to a separator 30 wherein the $Ca(NO_3)_2 \cdot 4H_2O$ crystals are filtered out and washed with nitric acid from supply line 20, which wash acid then continues into the return line 14.

Following separation of the calcium nitrate tetrahydrate the mother liquor is conducted through line 32 to a residual calcium separation vessel 34 wherein to the mother liquor is added sufficient sulphuric acid to precipitate any remaining calcium in the form of calcium sulphate. The sulphate precipitate containing mother liquor is then conducted through the line 36 to the separator 38 where the calcium sulphate is separated from the mother liquor and washed with nitric acid from the supply line 20, which nitric acid is then conducted to the return line 14. The remaining mother liquor is then conducted through a line 40 to a suitable vacuum stripping system 42 wherein remaining nitric acid, as well as volatilizable impurities are removed.

In order to guard against the danger of silicon dioxide build-up at this final purification stage of the process, we have found that tube-type heat exchangers should not be used for the condensation of the overhead vapors. The vacuum stripping system 42 is maintained at pressures of 100 mm. Hg or less, preferably about 50 mm. Hg. The system includes a pre-heater 44 wherein the temperature of the mother liquor coming through the line 40 can be raised rapidly to a temperature of approximately 50–60° to afford maximum heat input at minimum temperatures; this is highly desirable since the higher the temperature, the more corrosive the liquid becomes as the activity of hydrofluoric acid and other contaminants is greatly increased with high temperatures. The preheated mother liquor proceeds into the tower 46 where steam and nitric acid vapors are released by the liquor as the liquor descends through the plates or inert packing in the tower. The temperature at the bottom of the heat exchanger 48 is maintained at about 150–160° C. and at the top of the tower about 50–60° C. (at 50 mm. Hg pressure) so that the steam, nitric acid, silicon fluorides, HF and other volatiles go off through overhead line 50 as an effluent. The phosphoric acid proceeds downwardly through the tower and passes out of the system through outlet line 51. The acid thus produced is a highly concentrated phosphoric acid containing from 55–72% $P_2O_5$ with less than 1% combined fluorine and nitric acid contamination.

The effluent drawn off through the overhead line 50 from the packed tower 46 proceeds to the nitric acid fractionating tower 52 wherein this nitric acid along with the nitric acid taken off from the acidulation reaction vessel 10 is condensed for recirculation in the system through the line 16. In the event the effluent from the phosphoric acid purification tower 46 is not sufficiently free from fluorine for this procedure, it may proceed by way of the alternate line 53 (dotted outline) to a precipitating vessel 54 wherein the fluorine compounds are precipitated in the form of useful alkali silicon fluorides by a procedure subsequently described.

Yet another alternate for handling the overhead vapor from the vacuum supply system 42 is to totally condense the vapors in chilled nitric acid in the direct contact condensation apparatus 72 shown in dotted outline. The vapor leaves the tower through line 74 and enters the condenser 76 wherein it contacts chilled nitric acid from the chiller 78. This condensate is recirculated through the chiller by means of lines 80 and 82, some of the recirculated condensate being continuously drawn off from line 80 through line 84 which may connect up with line 14 if desired, or drawn off for conversion to other nitrates.

In order to cleanse the nitric acid-water vapor taken off from the acidulation reactor 10 through the overhead line 18, and possibly the effluent passing through the line 53 from the phosphoric acid purifier 46 in the event it contains a significant fluorine content, for recovering nitric acid for return to the acidulation reaction vessel 10, the vapor is introduced into a precipitating vessel 54 wherein alkali metal ions are maintained in excess quantities for reaction with the fluorine contaminants in the system to convert them to an alkaline silicon hexafluoride such as $Na_2SiF_6$, in accordance with the simplified reaction equation: $2NaNO_3 + SiF_4 + 2HF \rightarrow Na_2SiF_6 + 2HNO_3$. In order to maintain sufficient alkali metal ion concentration in the precipitator 54, an alkali compound, such as potassium hydroxide (if $K_2SiF_6$ is to be precipitated), or $Na_2CO_3$ (if $Na_2SiF_6$ is to be precipitated) is fed into the precipitator through the recycling line 70.

Presuming sodium ions in the precipitator, the $Na_2SiF_6$ is withdrawn from the vessel through line 66 to the separator 68 where the solid $Na_2SiF_6$ is separated and washed with water and the remaining solution is recycled back through the system through line 70. The $Na_2CO_3$, continuously fed into line 70 to maintain the level, preferably about 100% excess, of alkali metal ions in the precipitator 54 reacts with the nitric acid as follows: $Na_2CO_3 + 2HNO_3 \rightarrow 2NaNO_3 + CO_2 + H_2O$. Upon $Na_2SiF_6$ separation, the remaining nitric acid can be readily concentrated, if need be, to the 50–70% concentration desired for use in the acidulation reactor and returned to the system without any fluorine build-up occurring in the processing system; thus, there is provided a simple and effective means for recovering the fluorine in the form of highly useful products as a by-product of cleaning nitric acid for re-use in the system. In the fractionation tower 52 excess water, and the $CO_2$ generated by fluorine removal in cleansing the nitric acid for re-use are removed through the overhead line 58 and pass into exchanger 60 wherein the water is condensed and the $CO_2$ is taken off in a gaseous state through line 64. The water from the exchanger 60 then passes out through line 62. A part is returned to tower 52 as reflux and the remainder leaves the system to maintain the water balance of the system. The nitric acid recycled through the fractionating tower 52 through line 65 is constantly bled off during recycling to re-enter the acidulation system through the return line 16.

Our tests have shown that when phosphoric acid production by nitric acid acidulation is practiced in this manner the corrosion rate of the stainless steel materials generally considered to be at least susceptible to attack by nitric acid is maintained well below the permissible corrosion rate of 50 mils per year. This is believed to be brought about by the boiling conditions maintained in the acidulation reaction vessel which removes sufficient fluorine from the system initially so that no more than about 1% fluorine based on the initial rock content remains in the system.

Table 1
THE CORROSION OF VARIOUS METALS IN AQUEOUS HNO₃-HF MIXTURES

| Metal | Temperature, °C. | Liquid Concentration, wt. percent | | Corrosion rate,* mils/year |
|---|---|---|---|---|
| | | HNO₃ | HF | |
| Haynes 25—20% Cr, 15.0% W, 10% Ni, 3.0% Fe, 50% Co, 0.1% C | 60 | 41<br>43 | 1.3<br>3.0 | 11<br>273 |
| SS 304 L—18% Cr, 2.0% Mn, 10% Ni, 1.0% Si, .03% C | 60<br><br>70 | 45<br>48<br>42<br>44 | 0.24<br>0.9<br>0.3<br>1.4 | 8<br>13<br>7<br>57 |
| SS 310—25% Cr, 2.0% Mn, 20% Ni, 1.5% Si, 0.25% C | 60 | 42<br>44 | 0.3<br>3.6 | 2<br>863 |
| SS 309S—23% Cr, 2.0% Mn, 14% Ni, 1.0% Si, 0.2% C | 60 | 41<br>44 | 1.2<br>3.8 | 53<br>818 |

*Measured by average weight loss of repetitive immersions of 2″ x ½″ x ⅛″ plates of metal immersed in 100 cc. of liquid for minimum of 8 hours.

It is speculated that low corrosiveness of the liquid is also brought about by the unexpected clarification of the mother liquor by carrying out the acidulation in this fashion inasmuch as apparently many of the organic substances usually present which prevent clarification of the mother liquor are destroyed or absorbed by carrying out the acidulation reaction under these stringent conditions.

A specific example of the practice of the invention is given hereinafter to illustrate the practical practice of the process; it is to be understood however that the example is submitted for purposes of illustration only and not for purposes of limitation.

EXAMPLE

A Florida phosphate rock in the amount of 2205 parts was acidulated with 5962 parts of 52% and 464 parts 66% (from the recovery cycle) nitric acid. The composition of the phosphate rock was generally as follows:

| | Percent |
|---|---|
| $P_2O_5$ | 34.6 |
| CaO | 49.6 |
| $Fe_2O_3$ | .9 |
| $Al_2O_3$ | 1.0 |
| F | 3.9 |
| $SiO_2$ | 4.4 |
| Insolubles | 4.5 |

The amount of nitric acid added represents 25% excess of nitric acid over that required to convert all the calcium in the rock to calcium nitrate. The acid was preheated before introduction into the acidulation reactor and the aciducation carried out under atmospheric conditions with the temperature maintained between 122° to 125° C. Thirty five parts of powdered silicic acid was added to the reactor and under these conditions about 1000 parts of a 30 to 32% nitric acid vapor was taken off as a gaseous effluent carrying with it about 84% of the fluorine present in the rock in the form of hydrofluoric acid and silicon tetrafluoride, leaving about a .18% fluorine in the reaction mixture.

The effluent from the reactor was treated with 100% excess sodium ions, present as $NaNO_3$ (based on the reaction of sodium to form $Na_2SiF_6$), and yielded about 120 parts of sodium silicon hexafluoride as a precipitate. About 67 parts of sodium carbonate was added to replace the sodium ions which had been removed from the system by the precipitation.

The nitric acid vapor of the effluent, now substantially free from fluorine compounds after $H_2O$ and $CO_2$ removal was returned to the acidulation vessel at a 66% concentration. Four hundred sixty-four parts of acid were returned to the acidulation reaction vessel in this manner.

The reaction mixture from the acidulation reactor formed a liquid from which the sand and slime readily settled out leaving a remarkably clear liquid. In contrast, when the acidulation reaction is carried out at atmospheric pressures and not under boiling conditions, and without the addition of reactive silicate, it takes several days to obtain proper sedimentation and the liquid still contains colloidal particles. The sand and slime separated were washed with 1238 parts of 58% nitric acid and this wash acid was returned to the system for re-use in that form together with 50 parts of rinse water.

The remaining mother liquor was then subjected to chilling to form calcium nitrate tetrahydrate crystals, the chilling proceeding gradually until a final temperature of −15° C. was reached with a retention time on the order of two hours whereby sufficiently large crystals were grown to facilitate ready separation. The crystals were then simply separated out by filtration and removed about 95% of the lime originally present in the rock in the form of calcium nitrate tetrahydrate.

The remaining mother liquor, now in the amount of about 2392 parts with some residual calcium nitrate which did not crystallize, was then treated with 100 parts concentrated sulphuric acid. One hundred twenty two parts of calcium sulphate were precipitated and separated, the separated precipitate being washed with 614 parts nitric acid and 30 parts of rinse water, and the rinse water diluted nitric acid was then introduced into the acidulation reactor. The resulting mother liquor was a clear liquid containing approximately 1000 parts orthophosphoric acid, 610 parts nitric acid and 11 parts fluorine probably in the form of hydrofluoric acid, fluosilicic acid ($H_2SiF_6$) and silicon tetrafluoride.

The liquor was then introduced into a phosphoric acid stripper with the temperature of the tower at the top being 56° C. and at the bottom 160° C. at a pressure of 50 mm. of mercury. The tower was filled with inert packing and the vapor generated in the liquor was distilled off as 1370 parts of a nitric acid-water vapor containing 44.8% $HNO_3$, leaving a residue of 1084 parts of a phosphoric acid containing 67.4% $P_2O_5$ with only .04% $HNO_3$ and .1% F remaining.

The vapor was then treated by a direct contact condensation procedure of the kind illustrated by 72 previously described, and the $HNO_3$ condensate returned to the acidulation reactor.

The vacuum in the vacuum stripping apparatus has been found to effect the final purification of the phosphoric acid. Thus, for example, utilizing the quantities and general conditions of the example preceding it has been found when the phosphoric acid stripping is carried out under atmospheric conditions highly corrosive conditions result and the purity of the phosphoric acid recovered goes down.

With the same flow conditions as in the example preceding but with no vacuum on the stripping tower, the temperature at the top of the tower becomes 119° C. (as compared with 56° C. under 50 mm. Hg vacuum). When the bottom temperature is maintained at 160° C. a phosphoric acid is obtained containing only about 63% $P_2O_5$ and further containing about 3% nitric acid and about .15% fluorine.

Raising the bottom temperature to 180° and 220° C. respectively results in progressively purer acid, the phosphoric acid obtained at 220° C. being composed of about 66.5% $P_2O_5$ with less than about .05% $HNO_3$ and about .15% fluorine. This necessitates a rise in temperature from 160° C. with vacuum, to 220° C. without vacuum to achieve comparable results. Also, since the top tower temperature is also increased by about 65° C. with no vacuum, highly corrosive conditions result due to the presence at these high temperatures of fluorine and nitric acid.

The superiority of immediate fluorine removal during the acidulation reaction by carrying out this reaction in accordance with this invention is further apparent from the table of comparisons following.

*Table II*

| Acidulation reactor conditions | | | | Per pass percent of total F in rock removed in reactor | Residual fluorine concentration | | |
|---|---|---|---|---|---|---|---|
| Temp., ° C. | Total pressure, mm. Hg abs. | Silicic acid addition (finer than 100 mesh) | Reactor conditions | | Wt. percent F in reactor effluent | Wt. percent F in feed to H₃PO₄ stripper | Wt. percent F in effluent from H₃PO₄ stripper |
| 60 | 760 | No | No air stripping or boiling. | 10 | 1.02 *(3.50) | 2.52 | 4.34 |
| 60 | 760 | Yes | Air stripping | 34 | 0.75 *(2.57) | 1.76 | 3.01 |
| 75 | 90 | No | Boiling | 32 | 0.77 *(2.65) | 1.88 | 3.14 |
| 97 | 250 | No | ---do--- | 47 | 0.60 *(2.06) | 1.33 | 2.25 |
| 125 | 760 | No | ---do--- | 49 | 0.58 *(1.98) | 1.25 | 2.12 |
| 60 | 43 | Yes | Boiling | 62 | 0.43 *(1.48) | 0.83 | 1.38 |
| 83 | 140 | Yes | ---do--- | 68 | 0.36 *(1.25) | 0.73 | 1.20 |
| 125 | 760 | Yes | ---do--- | 81 | 0.22 *(.74) | 0.50 | 0.81 |

*Show wt. percent fluorine of the rock remaining in the reaction mixture.

As is apparent from the table, carrying out the acidulation reaction under boiling conditions even in the absence of added silicic acid when the temperature is maintained at least as high as about 100° C. greatly enhances fluorine removal as compared to prior known procedures and reduces the fluorine content to less than 2% of the rock. Further, carrying the acidulation reaction out under boiling conditions at temperatures as low as 60° C. and in the presence of finely divided silicic acid further increases the disparity between this invention and prior known nitric acid acidulation reaction procedures. Optimum results are obtained when the reaction is carried out under boiling conditions at temperatures from about 80–130° C., and preferably 100–130° C. in the presence of finely divided silicic acid.

While the process has been described by carrying through the refinement of the mother liquor to high grade phosphoric acid, it is to be understood that the advantages accruing by the acidulation procedure of this invention are maintained regardless of the stage wherein refinement of the mother liquor is stopped. Thus, after the first calcium nitrate separation or at any subsequent stage, rather than further refine the remaining liquor toward the production of phosphoric acid, it is often desirable to simply convert the liquor to phosphates and nitrates by procedures well known to the art. These, and other variations of treatment of the liquor after acidulation are considered within the ambit of this invention since in one aspect, this invention provides a means for improving this liquor for any subsequent refinement.

We claim:
1. A process for producing phosphoric acid by the acidulation of phosphate rock with nitric acid which comprises dissolving the phosphate rock in an excess of nitric acid having a concentration of 40–70 percent under boiling conditions at a temperature range of 100–130° C., and at a pressure of from about 200 mm. of Hg to about atmospheric pressure, and in the presence of at least about one-half part finely divided silicon for each part fluorine present in the rock, volatilizing from the reaction mixture an effluent comprising unreacted nitric acid, silicon tetrafluoride and HF, thereafter removing the fluorine as an alkali metal silicon hexafluoride and returning the nitric acid of the effluent to the acidulation reaction removing substantially all of the calcium constituents from the remaining reaction mixture, and thereafter subjecting the resultant phosphoric acid-nitric acid containing liquor to vacuum stripping and volatilizing the remaining nitric acid therefrom, condensing the thus volatilized remaining nitric acid by contact with cooler liquid nitric acid, and then recovering the remaining phosphoric acid.

2. The process of claim 1 wherein the nitric acid in which said phosphate rock is dissolved is at least about 15 percent in excess of the stoichiometric requirement.

References Cited by the Examiner

UNITED STATES PATENTS

| | | | |
|---|---|---|---|
| 2,114,600 | 4/38 | Larsson | 71—39 X |
| 2,134,013 | 10/38 | Turrentine | 71—39 |
| 2,164,627 | 7/39 | Seyfried | 71—39 |
| 2,504,446 | 4/50 | Plusje | 23—102 |
| 2,683,075 | 7/54 | Caldwell | 71—39 |
| 2,942,967 | 6/60 | Caldwell | 71—39 |
| 3,002,812 | 10/61 | Williams | 71—39 |

DONALL H. SYLVESTER, *Primary Examiner.*

GEORGE D. MITCHELL, ANTHONY SCIAMANNA,
*Examiners.*